United States Patent
Gajjala et al.

(10) Patent No.: US 10,158,495 B2
(45) Date of Patent: Dec. 18, 2018

(54) REMOTE HARDWARE DEVICE CONVERSION

(71) Applicant: Microsoft Technology Licensing, LLC, Redmond, WA (US)

(72) Inventors: Vijay Gajjala, Redmond, WA (US); Gershom L. Payzer, Seattle, WA (US); Mehmet Erkilic, Seattle, WA (US); Caleb S. Atwood, Seattle, WA (US); Manuel C. Ovena, Edmonds, WA (US); Stephan Zachwieja, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 15/252,162

(22) Filed: Aug. 30, 2016

(65) Prior Publication Data

US 2018/0062860 A1  Mar. 1, 2018

(51) Int. Cl.
| | |
|---|---|
| *G06F 1/00* | (2006.01) |
| *H04L 9/32* | (2006.01) |
| *G06F 9/4401* | (2018.01) |
| *G06F 8/65* | (2018.01) |
| *H04L 29/06* | (2006.01) |
| *G06F 21/74* | (2013.01) |

(52) U.S. Cl.
CPC .............. *H04L 9/3268* (2013.01); *G06F 8/65* (2013.01); *G06F 9/4401* (2013.01); *G06F 21/74* (2013.01); *H04L 63/062* (2013.01)

(58) Field of Classification Search
CPC ....... H04L 9/3268; H04L 63/062; G06F 8/65; G06F 9/4401; G06F 21/74

USPC ................ 713/1, 193, 2, 156, 155; 709/225; 726/10
See application file for complete search history.

(56) References Cited

U.S. PATENT DOCUMENTS 7,707,405 B1 *  4/2010  Gilman .................... G06F 21/33
                                                      713/156
8,281,119 B1 * 10/2012  Spangler ............... G06F 9/4401
                                                      713/1

(Continued)

FOREIGN PATENT DOCUMENTS

WO       2013120511         8/2013

OTHER PUBLICATIONS

Toepke, et al., "Getting started with UWP app development on Xbox One", Retrieved on: Jun. 29, 2016, 3 pages, available at: https://msdn.microsoft.com/en-us/windows/uwp/xbox-apps/getting-started.

*Primary Examiner* — Aurel Prifti

(57) ABSTRACT

Examples of the disclosure remotely activate a secure device for application development. A request is received at a device entitlement component for a developer kit from a secure device in a user mode via a network. A determination is made as to whether the secure device is in at least one allowed development group. In response to determining that the secure device is in the at least one allowed development group, a certificate is generated defining a permissions level associated with the developer identifier for the secure device. The certificate is transmitted to the secure device, including a key that interacts with a security processor of the secure device to convert hardware capabilities of the secure device to provide a developer mode at the secure device.

20 Claims, 6 Drawing Sheets

(56) References Cited

U.S. PATENT DOCUMENTS

| | | | | |
|---|---|---|---|---|
| 8,683,226 B2* | 3/2014 | Popp | ...................... | G06F 21/73 |
| | | | | 713/155 |
| 9,052,960 B2* | 6/2015 | Lowry | ................... | G06Q 10/06 |
| 2005/0080899 A1* | 4/2005 | Vogel | ................... | H04L 9/3236 |
| | | | | 709/225 |
| 2008/0214309 A1 | 9/2008 | Gatto et al. | | |
| 2009/0183010 A1* | 7/2009 | Schnell | ................... | G06F 21/10 |
| | | | | 713/193 |
| 2011/0087870 A1* | 4/2011 | Spangler | ............... | G06F 21/554 |
| | | | | 713/2 |
| 2014/0359747 A1* | 12/2014 | Le | ...................... | H04L 63/0823 |
| | | | | 726/10 |
| 2015/0134940 A1* | 5/2015 | Mrvaljevic | ............ | G06F 13/38 |
| | | | | 713/1 |
| 2015/0199028 A1* | 7/2015 | Spangler | ............... | G06F 3/0227 |
| | | | | 713/2 |
| 2015/0199190 A1* | 7/2015 | Spangler | ................ | G06F 8/665 |
| | | | | 713/2 |
| 2015/0288659 A1* | 10/2015 | Lukacs | .............. | H04L 63/0227 |
| | | | | 713/2 |

* cited by examiner

REMOTE HARDWARE DEVICE CONVERSION

BACKGROUND

Secure devices are often cryptographically prevented from running any software that has not been approved, or signed, by the producer of the secure device. Traditionally, in order to develop applications for a type of secure device, developers use specialized development hardware devices acquired from the secure device producer, known as development kits or dev kits, that have a security profile allowing the developer to run unapproved software for development and testing.

SUMMARY

Examples of the disclosure provide a system and method for remotely activating a secure device for application development. A request is received at a device entitlement component for development capabilities from a secure device in a user mode via a network. A determination is made as to whether the secure device is in at least one allowed development group. In response to determining that the secure device is in the at least one allowed development group, a certificate is generated defining a permissions level associated with the developer identifier for the secure device. The certificate is transmitted to the secure device, including a key that interacts with a security processor of the secure device to convert hardware capabilities of the secure device to provide a developer mode at the secure device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable remote activation of developer hardware capabilities in a secure device. As used herein, remote activation refers to activation of a device in the field over a network or via another authorized device. A device entitlement service manages requests from secure devices for developer kits, providing activation codes and facilitating access between the secure device and a development center backend for transmission of a cryptographically signed certificate from the development center backend to the secure device. The cryptographically signed certificate includes a key that interacts with a security processor of the secure device to transform the hardware capabilities of the secure device, activating developer hardware capabilities to convert the secure device into a development capable hardware device.

While various secure devices, such as gaming consoles for example, have existed for some time, the ability to develop for them has been gated by access to specialized hardware that has to be purchased through the device manufacturer. In most cases, the hardware acquisition process for development capable hardware requires a developer to submit their application development concept, endure a lengthy approval process, and then purchase specialized hardware from the manufacturer. This is often referred to as a dev kit acquisition process, which also involves the signing of non-disclosure agreements to gain access to the development platform for that particular device. Development hardware for any popular secure device platform is not readily available through retail purchase channels.

Aspects of the disclosure enable increased accessibility and expansion of development possibilities to more developers by providing in-field activation of hardware purchased or acquired through any retail channel. In addition, user interaction performance and user efficiency in developing applications for secure devices is provided because a secure device obtained through retail purchase channels may be remotely activated as developer capable hardware at the request of the user. By providing sandboxing of developer capabilities and retail user capabilities on the activated secure device, the system also protects against the introduction of malicious code.

Figure 1:
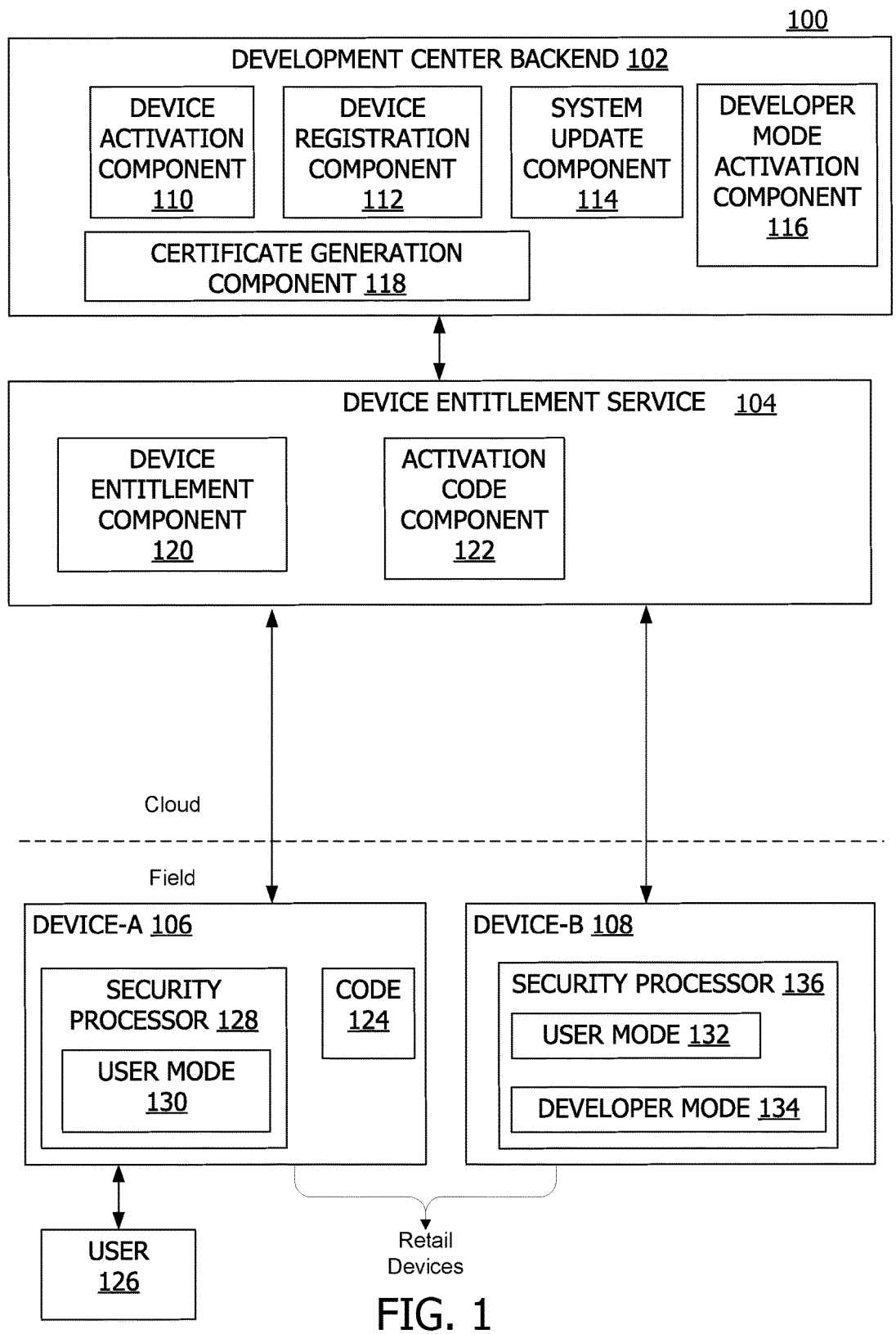
FIG. 1 is an exemplary block diagram illustrating a remote hardware device conversion environment.

Referring again to FIG. 1, an exemplary block diagram illustrates a remote hardware device conversion environment. In the example of FIG. 1, device conversion environment 100 depicts devices that may include computing devices, such as secure devices. A computing device represents any device executing instructions (e.g., as application programs, operating system functionality, or both) to implement the operations and functionality as described herein. The computing device may include a mobile computing device, an embedded computing device, or any other portable device. In some examples, the mobile computing device includes a mobile telephone, laptop, tablet, computing pad, netbook, gaming device, wearable device, and/or portable media player. The computing device may also include less portable devices such as desktop personal computers, kiosks, tabletop devices, industrial control devices, wireless charging stations, electric automobile charging stations, appliances, home automation components, or any other embedded devices. A secure device may include any device that is locked down to limit use of any software or process that is not approved by the device manufacturer. The terms secure device and computing device may be used interchangeably herein.

In some examples, a computing device has at least one processor and a memory area, and optionally at least one user interface. The processor may include any quantity of processing units, and may be programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIGS. 3 and 4).

In some examples, the processor represents an implementation of analog techniques to perform the operations described herein. For example, the operations may be performed by an analog computing device and/or a digital computing device.

The computing device further may include one or more computer readable media such as the memory area. The memory area includes any quantity of media associated with or accessible by the computing device. The memory area may be internal to the computing device, external to the computing device, or both (not shown). In some examples, the memory area includes read-only memory and/or memory wired into an analog computing device.

The memory area stores, among other data, one or more applications. The applications, when executed by the processor, operate to perform functionality on the computing device. The applications may communicate with counterpart applications or services such as web services accessible via a network. For example, the applications may represent downloaded client-side applications that correspond to server-side services executing in a cloud. In some examples, applications generated may be configured to communicate with data sources and other computing resources in a cloud during runtime, or may share and/or aggregate data between client-side services and cloud services. The memory area may store data locally, may store data access points associated with data stored remote from the computing device, or any combination of local and remote data.

The memory area further stores one or more computer-executable components. Exemplary components may include a user interface component. A computer-executable component, when executed by the processor of the computing device, cause the processor to perform operations, such as receiving a cryptographically signed certificate and interacting with a key included therein to transform hardware capabilities of the processer, for example.

Device conversion environment 100 includes development center backend 102 and device entitlement service 104, illustratively implemented in the cloud, and a plurality of secure devices in the field, such as device-A 106 and device-B 108. Although two secure devices are depicted for exemplary purposes, the illustrative example provided by FIG. 1 does not limit aspects of the disclosure to any number of devices, and in fact millions of devices may be in the field and capable of entering device conversion environment 100 as provided by aspects of this disclosure.

Development center backend 102 provides for and supports remote activation and management of developer capable hardware. A secure device communicates with development center backend 102 via device entitlement service 104 in order to obtain a certificate that converts hardware capabilities of the secure device and receive updates and notifications as necessary to maintain developer capabilities on the secure device. Developer capabilities may include deploying an application, other than manufacturer-approved or proprietary applications, on the secure device in order to test and develop a new application for the device, debugging an application using the secure device, tracing, accessing graphical processing unit (GPU), and the like. Development center backend 102 may also provide other functions that may not be able to be performed solely on the device-side, such as processing data, sharing data, synchronizing data, storing large data files, and the like. Developer center backend 102 may be a partitioned backend in some examples.

Developer center backend 102 includes device activation component 110, device registration component 112, system update component 114, developer mode activation component 116, and certificate generation component 118. Device registration component 112 may maintain a plurality of device identifiers and corresponding developer identifiers, with individual devices linked to an individual developer account to form registered device-developer pairs. Device registration component 112 may also maintain a plurality of developer accounts having associated developer identifiers. The developer accounts may contain information about developer identifiers that have been registered with device conversion environment 100.

In this example, device-A 106 is a retail device, such as a gaming console or other secure device obtained through retail channels. Device-A 106 includes security processor 128, which is locked down to user mode 130. As used herein, user mode refers to a consumer mode, or retail mode, which restricts security processor 128 to running applications and/or processes that are approved by the manufacturer of device-A 106. Device-A 106 sends a request for development capabilities, or a devkit request, to device entitlement service 104. Device entitlement component 120 uses the developer identifier included in the request to check with device registration component 112 of development center backend 102 and determine if the user has a registered developer account. In this example, the developer identifier corresponds to user 126 associated with device-A 106. Upon determining that user 126 is in an allowed group, or has a registered developer account, activation code component 122 of device entitlement service 104 generates an activation code and transmits activation code 124 to the requesting secure device, device-A 106. The activation codes generated by activation code component 122 in these examples may be one-time use, time-bombed codes tied to the hardware of the requesting device.

The activation code 124 provided to device-A 106 is entered at development center backend 102 to link device-A 106 with the developer account of user 126. This allows development center backend 102 to identify user 126 as a developer within device conversion environment 100. At the point of code entry, device activation component 110 associates device-A 106 with a system update group and developer mode activation group.

When a secure device is associated with the system update group by device activation component 110, system update component 114 transmits a system update to the associated secure device. Concurrently, or substantially concurrently, developer mode activation component 116 sends a request to certificate generation component 118 to generate a cryptographically signed certificate, including a key, to activate developer mode capabilities on the associated secure device.

Certificate generation component 118 identifies a tier or level associated with the developer, such as user 126, in a hierarchical set of development levels. The associated tier may be identified in the developer account registered with device registration component 112, for example. The tiers or levels define the development capabilities that may be unlocked for that particular developer and/or device. Certificate generation component 118 generates a certificate for a specific hardware device that defines the set of development capabilities for that specific device. For example, development hardware capabilities may include, without limitation, deploying applications on the secure device, debugging applications on the secure device, tracing, accessing graphics processing unit (GPU), and so forth. The certificate generated may also include an activation period, or time period, associated with the certificate and the hardware capabilities defined therein. Certificate generation component 118 may register the secure device as a development device for a time period corresponding to an activation period of the certificate, in some examples. Upon expiration of the time period, the certificate may expire, which may revoke development capabilities from the secure device, or lock down the development capabilities until an updated certificate is received, for example. Upon revoking the certificate from the secure device, hardware capabilities of the secure device may be reverted back to the user mode hardware capabilities. In some examples, revoking the certificate may unregister the secure device as a development device in device registration component 112. Development hardware capabilities are defined by the certificate, and may be increased or decreased by updating the certificate.

Certificate generation component 118 includes a key in the generated certificate, the key configured to interact with the security processor of the secure device to unlock development hardware capabilities as defined by the certificate, as well as instructing the security processor to partition the operating system of the secure device in order to provide state separation between the user mode and the developer mode. This provides a system that sandboxes user mode capabilities and developer mode capabilities, which further protects against introduction of malicious code.

Certificate generation component 118 passes the generated certificate to developer mode activation component 116, and developer mode activation component 116 cryptographically signs and transmits the generated certificate to the requesting secure device. When the secure device receives the system update and cryptographically signed certificate, and applies them, the secure device reboots as a developer mode capable hardware device. The developer mode capabilities are limited to a developer mode, while consumer or user capabilities remain limited to a user mode. In this way, a new user interface element may be provided that allows a user to select, at system start or boot time, whether to boot they system in a developer mode or user mode.

Device-B 108 is an illustrative example of a secure device that has applied a received system update and certificate from development center backend, providing a user mode 132 and a developer mode 134 at security processor 136.

Figure 2:
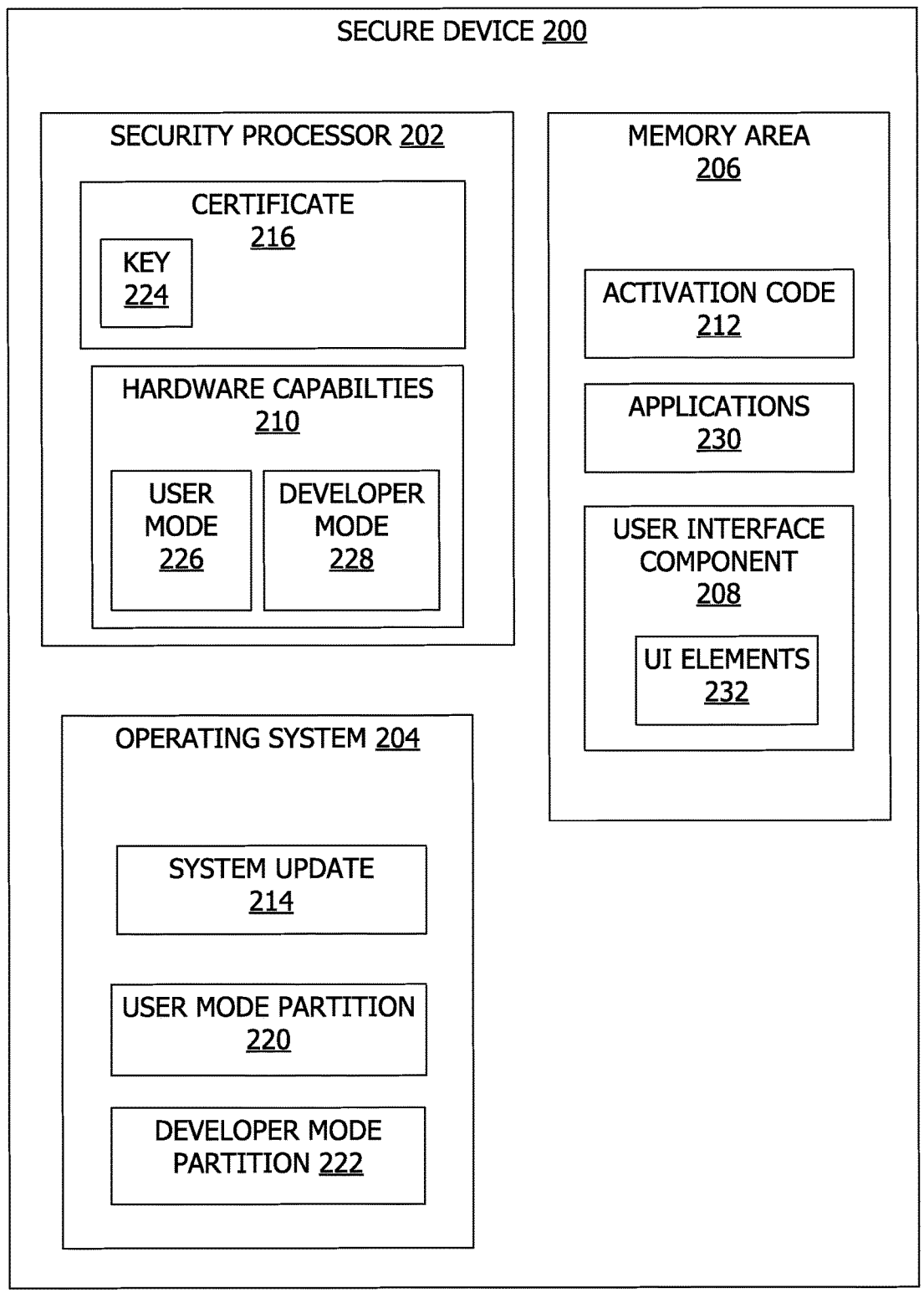
FIG. 2 is an exemplary block diagram illustrating a secure device remotely converted for development.

FIG. 2 is an exemplary block diagram illustrating a secure device remotely converted for development. Secure device 200 may be an illustrative example of device-A 106 or device-B 108 in FIG. 1.

Secure device 200 illustrates a computing device for consumer use that may be remotely activated for development use. The computing device represents any device executing instructions (e.g., as application programs, operating system functionality, or both) to implement the operations and functionality as described herein. The computing device may include a mobile computing device or any other portable device. In some examples, the mobile computing device includes a mobile telephone, laptop, tablet, computing pad, netbook, gaming device, and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device has at least one processor, a memory area, and at least one user interface. The processor includes any quantity of processing units, and is programmed to execute computer-executable instructions for implementing aspects of the disclosure. In some examples, the at least one processor is a security processor. The instructions may be performed by the processor or by multiple processors within the computing device, or performed by a processor external to the computing device. In some examples, the processor is programmed to execute instructions such as those illustrated in the figures (e.g., FIG. 3 and FIG. 4).

The computing device further has one or more computer readable media such as memory area 206. The memory area includes any quantity of media associated with or accessible by the computing device. The memory area may be internal to the computing device (as shown in FIG. 2), external to the computing device (not shown), or both (not shown). In some examples, the memory area includes read-only memory and/or memory wired into an analog computing device.

The memory area stores, among other data, one or more applications 230. The applications, when executed by the processor, operate to perform functionality on the computing device. Exemplary applications include developer applications generated in a developer mode after remote activation of development hardware capabilities on the computing device. The applications may communicate with counterpart applications or services such as web services accessible via a network (not shown). For example, the applications may represent downloaded client-side applications that correspond to server-side services executing in a cloud. In some examples, applications generated may be configured to communicate with data sources and other computing resources in a cloud during runtime, or may share and/or aggregate data between client-side services and cloud services. The memory area may store locally, may store data access points locally, which are associated with data stored remote from secure device 200, or any combination of local and remote data.

The memory area further stores one or more computer-executable components. Exemplary components include a user interface component and a communications component. The user interface component 208, when executed by the processor of secure device 200, cause the processor to perform operations, including to receive user selections during user interaction with operating system 206 to boot in a specific mode, for example.

In some examples, the user interface component includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way. In another example, the user may input commands or manipulate data by providing a gesture detectable by the user interface component, such as a touch or tap of a touch screen display or natural user interface.

Secure device 200 includes security processor 202, operating system 204, memory area 206, and user interface component 208. Security processor 202 may be a secure cryptoprocessor, or dedicated microprocessor for carrying out cryptographic operations, which provides tamper resistance measures for secure device 200. Security processor 202 may manage, control, or otherwise provide hardware capabilities 210 to secure device 200, such as execution of applications for example.

Secure device 200 may receive activation code 212 in response to a request for a dev kit, or a request to activate development capabilities on secure device 200. Upon entering activation code 212 at a development center, such as development center backend 102 in FIG. 1, operating system 204 may receive system update 214, and security processor 202 may receive certificate 216 from the development center. Operating system 204 may apply system update 214, which may partition operation system 204, providing user mode partition 220 and developer mode partition 222. Certificate 216 may include key 224, which interacts with security processor 202 to transform and/or convert hardware capabilities 210, providing state separation between a user mode 226 and a developer mode 228. User mode 226 includes user hardware capabilities, while developer mode 228 includes developer hardware capabilities.

User interface component 208 may include a plurality of user interface (UI) elements 232. UI elements 232 may include a graphical representation of a selection between a user mode and a developer mode at system start or boot time, for example, to provide for selection of a mode to boot secure device. System update 214 may include a new UI element for mode selection as part of the system update, for example.

Figure 3:
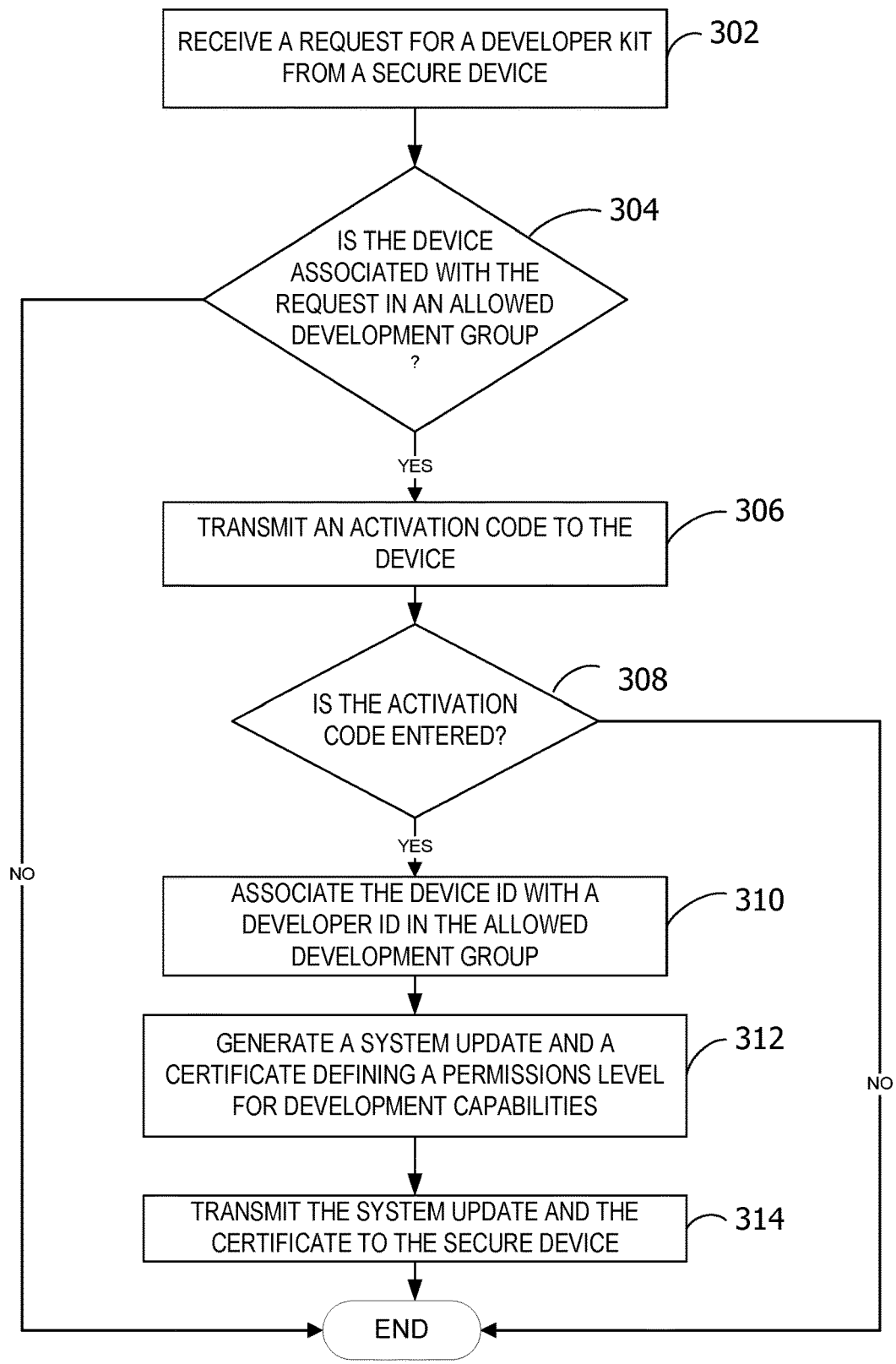
FIG. 3 is an exemplary flow chart illustrating operation of the development center backend to manage remote hardware device conversion.

FIG. 3 is an exemplary diagram illustrating operation of the development center backend to manage remote hardware device conversion.

The process begins by receiving a request for a developer kit, or devkit, from a secure device at operation 302. The request includes a device identifier, which the process optionally uses at operation 304 to determine whether the device associated with the request is in an allowed development group. An allowed development group may be a group where a user has registered as a developer, or has a developer account, that may be linked to the device requesting development capabilities. Alternatively, the process may proceed directly from operation 304 to operation 306, in examples where an allowed development group check is an optional or configurable step.

If a determination is made that the device associated with the request is in an allowed development group, the process transmits an activation code to the device at operation 306. The activation code may be a unique, one-time use code tied to the hardware of the requesting device and generated by an activation component of a device entitlement service, such as activation code component 122 in FIG. 1, for example. If a determination is made that the device associated with the request is not in an allowed development group, the process terminates, or optionally sends a failure notification or rejection notice in response to the request.

The process determines whether the activation code is entered at operation 308. The activation code may be time-bombed, or otherwise valid for a limited period of time, in some examples. If a determination is made that the activation code is entered, and valid, the process associates the device identifier (ID) with a developer identifier (ID) in the allowed development group at operation 310. If a determination is made that the activation code is not entered within the valid time period, or the entered code is no longer valid, the process terminates, or optionally returns a failure notification or rejection notice in response to the activation attempt, if any.

Upon association of the device ID with the developer ID at operation 310, the process generates a system update and a certificate defining permissions level for development capabilities at operation 312. The process transmits the system update and the generated certificate to the secure device at operation 314, with the process terminating thereafter. Optionally, the process may further transmit other system updates or certificate updates, as determined by the system update group and developer mode activation group associated with the secure device at device registration and activation. In other examples, the system update may be optional, and the process may generate and transmit the certificate without providing a system update at operation 312 and operation 314.

Figure 4:
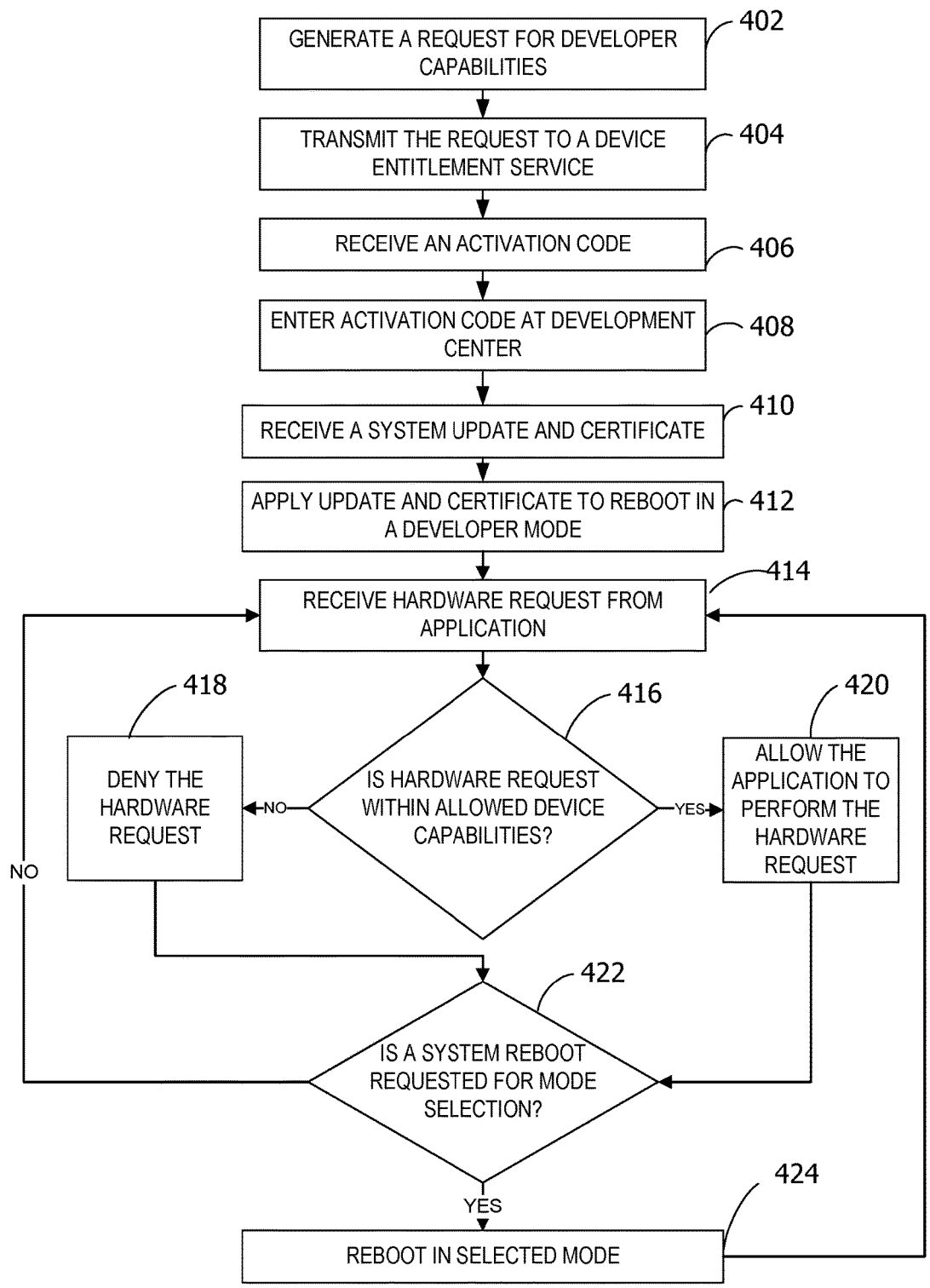
FIG. 4 is an exemplary flow chart illustrating operation of the secure device to transform from a user device to development capable hardware.

FIG. 4 is an exemplary diagram illustrating operation of the secure device to transform from a user device to development capable hardware.

The process begins by generating a request for developer capabilities at operation 402. The request may include a device ID and a developer ID associated with the user initiating the request or associated with the device, for example. The process transmits the request to a device entitlement service at operation 404.

The process receives an activation code at operation 406. The activation code may be received in response to the device entitlement service identifying the device as in an allowed development group, or the user as a registered developer with a developer account, for example, and generating a unique activation code for the device to use in response to the approved request.

The process enters the activation code at the development center at operation 408. In some examples, the system may automatically enter the received activation code at the development center, via an internet browser or communications network for example. The process receives a system update and certificate at operation 410.

In response to receiving the system update and certificate, the process applies the system update and certificate to reboot in a developer mode at operation 412. Subsequently, when a hardware request is received from an application at operation 414, the process determines whether the hardware request is within allowed device capabilities at operation 416. The allowed capabilities are defined by the certificate, applied at operation 412, which interacts with the security processor of the secure device to unlock specific development hardware capabilities according to a permissions level defined by the certificate.

If a determination is made that the hardware request is not within allowed device capabilities, the process denies the hardware request at operation 418. If a determination is made that the hardware request is within allowed device capabilities, the process allows the application to perform the hardware request at operation 420.

At operation 422 the process determines if a system reboot is requested for mode selection. If the process determines that a system reboot is not requested, or a mode selection change request has not been received, the process returns to operation 414. If the process determines that a system reboot is requested, or a mode selection change request is received, the system reboots in the selected mode at operation 424, and returns to operation 414 thereafter.

Figure 5:
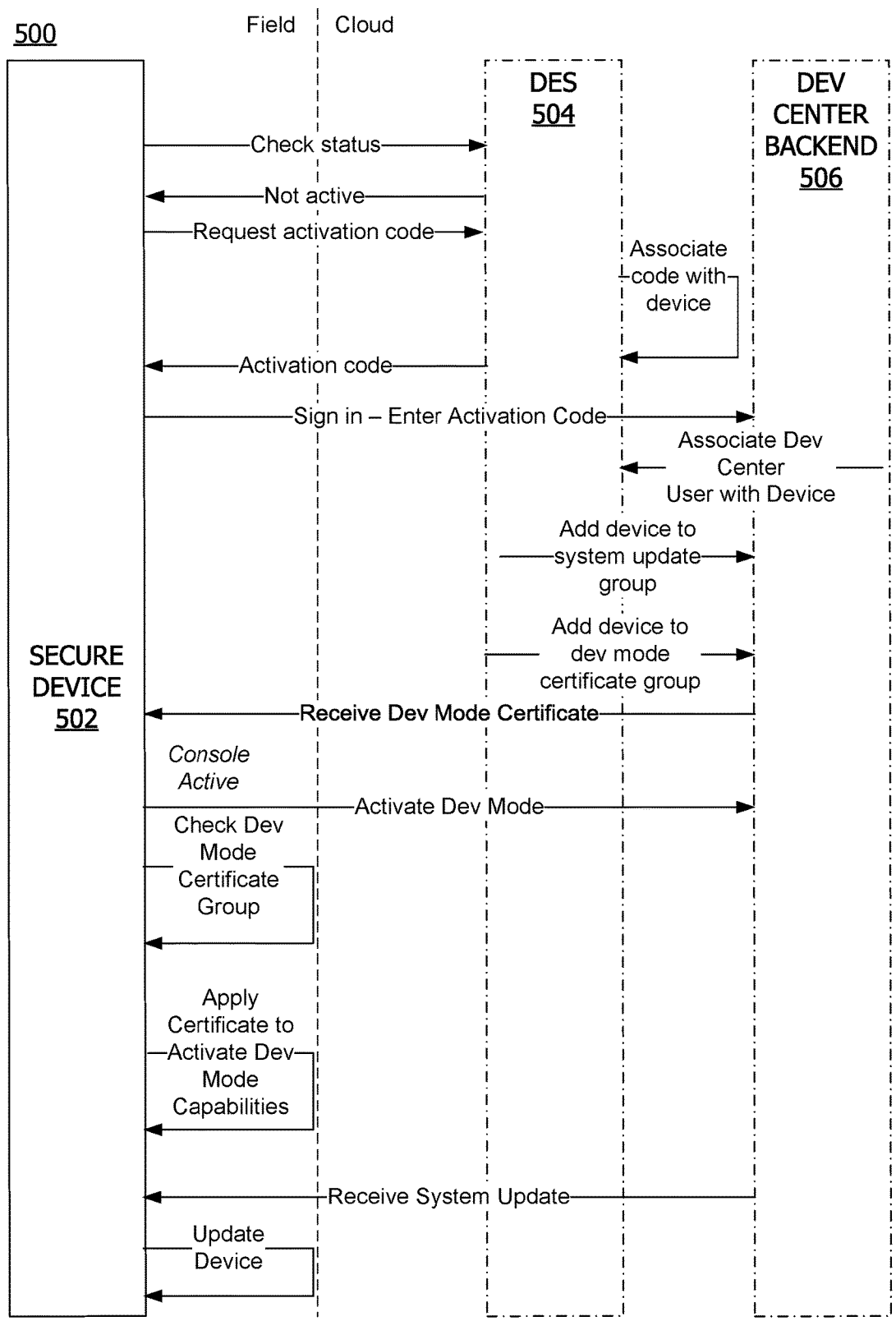
FIG. 5 is an exemplary diagram illustrating remote hardware device conversion.

FIG. 5 is an exemplary diagram illustrating remote hardware device conversion. The exemplary operations presented in FIG. 5 may be performed by one or more components described in FIG. 1 and FIG. 2, for example.

Device conversion environment 500 includes an illustrative secure device 502. Secure device 502 may be a retail device, such as a gaming console or wearable gaming device, obtained through retail channels and operating in a user or consumer mode in the field. Secure device 502 may interact with device entitlement service (DES) 504 and development center backend 506 to request remote activation of development capabilities in secure device 502, in order to remotely activate secure device 502 and convert secure device 502 into development capable hardware.

Secure device 502 may request and receive an activation code from DES 504, and use the activation code to sign in to development center backend 506. Development enter backend 506 then associates the development center user with the device, adds the device to a systems update group and to a development mode certificate group, generating a system update and cryptographically signed certificate for secure device 502. Secure device 502 receives the system update and certificate and activates a developer mode, converting secure device 502 into developer capable hardware.

Additional Examples

In some examples, rebooting the secure device in developer mode disables consumer functions, such as retail gaming functions in a gaming console, to protect against piracy and avoid introduction of malicious code. The system sandboxes hardware capabilities in each of the user and developer modes, and provides state separation between the different modes, including partitioning the operating system. The system update received by the secure device upon activation may include new or updated user interface capabilities, such as a user interface element providing for selection between the development mode and user mode, for example.

Users associated with the systems update group upon device activation may receive development specific build updates, and other system updates directed to developer hardware capabilities. Additionally, the development capabilities may be revoked remotely, and the certificate updated or revoked as well. In some examples, aspects of the disclosure provide for the ability to increase or decrease the hardware capabilities associated with a certificate, via a certificate update for example.

Aspects of this disclosure increase the developer population for a specific secure device or development environment while decreasing the cost of development by eliminating the need to distribute locked down development consoles or specialized hardware, and instead providing for remote activation of retail devices to enable development hardware capabilities. This not only increases the number of potential applications for a secure device environment, but also increases consumer satisfaction by presenting applications for a broader range of consumers. The system and method provided herein provides any user wishing to write a game or an application to run on a secure device, such as a gaming console or wearable gaming device, an opportunity to start development within a relatively short time period using their retail device.

Alternatively, or in addition to the other examples described herein, examples include any combination of the following:
  determining whether a valid activation code is entered by the secure device at a development center backend;
  responsive to a determination that the valid activation code is entered, associating the secure device with a developer system update group and a developer mode activation group, the developer system update group providing dynamic system updates to the secure device, the developer mode activation group managing certificates transmitted to the secure device;
  wherein the key included with the certificate further invokes a new user interface element of a user interface associated with the secure device, the new user interface element providing a selection between the user mode and the developer mode at system boot time;
  wherein the key included with the certificate further partitions an operating system of the secure device to provide state separation between the user mode and the developer mode, the developer mode blocking execution of user mode content, and the user mode blocking execution of developer mode content;
  registering the secure device as a development device for a time period corresponding to an activation period of the certificate;
  revoking the certificate from the secure device, including reverting the hardware capabilities of the secure device back to the user mode and unregistering the secure device as a development device;
  wherein the secure device is a retail gaming device;
  updating the hardware capabilities of the secure device via a certificate update;
  wherein the key that interacts with the security processor further partitions an operating system of the secure device to provide state separation between the user mode and the developer mode, the developer mode blocking execution of user mode content, and the user mode blocking execution of developer mode content;
  generating a new user interface element for a user interface of the secure device, the new user interface element providing a selection between the developer mode and the user mode at system boot time;
  wherein the cryptographically signed certificate further manages communication between applications executing on the secure device and the security processor, the security processor allowing or denying capabilities to the executing applications based on parameters provided by the cryptographically signed certificate;
  an operating system, the operating system partitioned by the key of the cryptographically signed certificate to provide state separation between a user mode and a developer mode;
  wherein the operating system receives queries from one or more applications executing on the secure device and transmits the queries to the security processor for processing, the security processor processing the queries against the cryptographically signed certificate to determine responses to the queries;
  a user interface component, the user interface component providing a selection between a user mode and a developer mode at system boot time in response to the key converting hardware capabilities of the secure device;
  wherein the security processor reboots the secure device in the developer mode as developer mode capable hardware in response to receiving a selection of the developer mode at the user interface component;
  wherein the communication component further receives a revocation of the cryptographically signed certificate, including a revocation of the key that interacts with the security processor, reverting hardware capabilities of the secure device to deactivate developer mode capabilities;

wherein the communication component receives system updates from a developer system update group and certificate updates from a developer mode activation group via the network in response to activated developer mode capabilities on the secure device;

wherein the cryptographically signed certificate further defines a hierarchical development level corresponding to a developer identifier and a device identifier associated with the secure device.

In some examples, the operations illustrated in FIG. 3 and FIG. 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Figure 6:
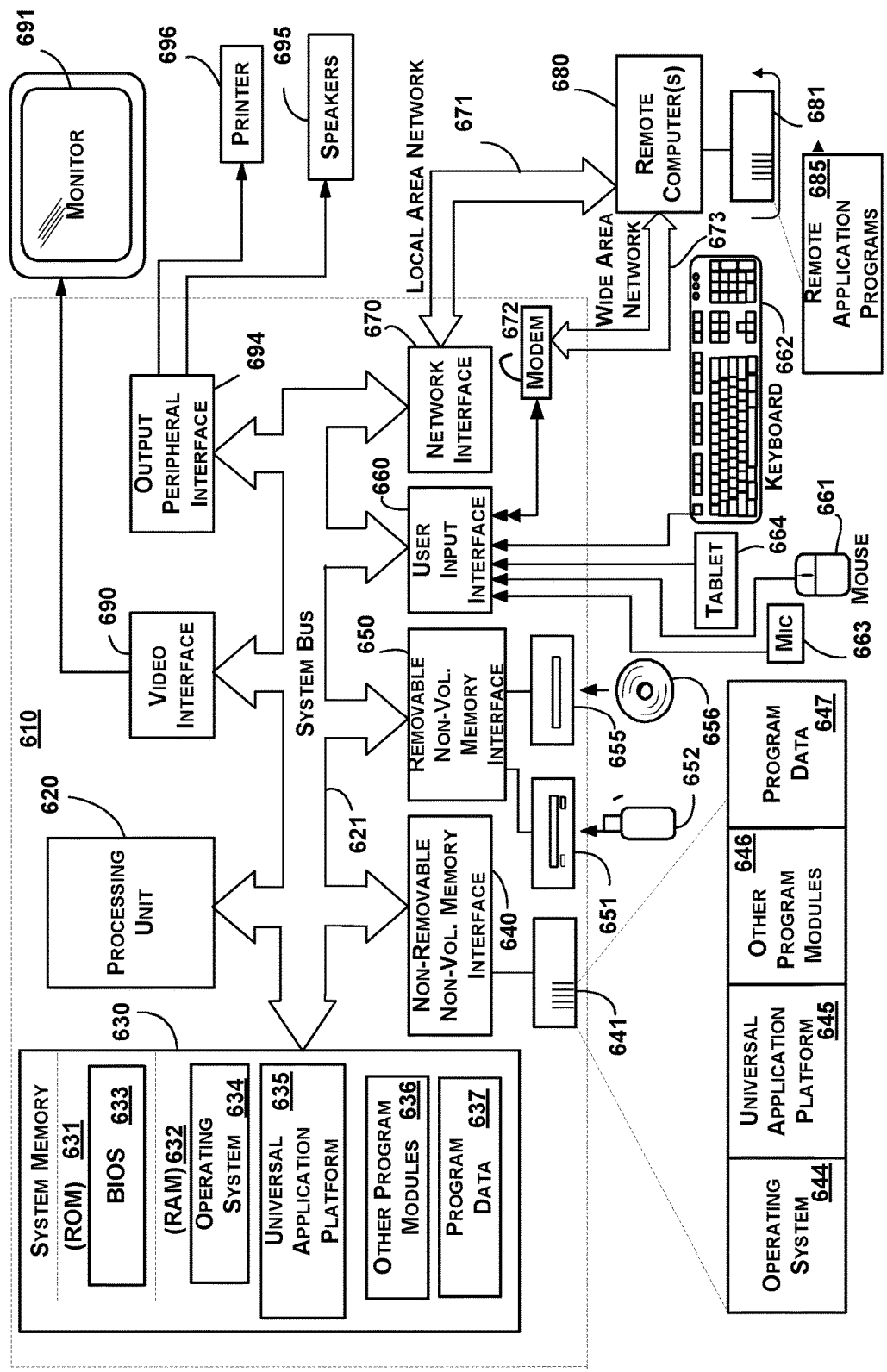
FIG. 6 is an exemplary block diagram illustrating an operating environment for a computing device implementing remote activation of development capabilities for a secure device.

FIG. 6 illustrates an example of a suitable computing and networking environment 600 on which the examples of FIG. 1 and FIG. 2 may be implemented. The computing system environment 600 is only one example of a suitable computing environment and is not intended to suggest any limitation as to the scope of use or functionality of the disclosure. Neither should the computing environment 600 be interpreted as having any dependency or requirement relating to any one or combination of components illustrated in the exemplary operating environment 600.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 6, an exemplary system for implementing various aspects of the disclosure may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media may be any available media that may be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or the like. Memory 631 and 632 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computer 610. Computer storage media does not, however, include propagated signals. Rather, computer storage media excludes propagated signals. Any such computer storage media may be part of computer 610.

Communication media typically embodies computer-readable instructions, data structures, program modules or the like in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs, such as universal application platform 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a universal serial bus (USB) port 651 that provides for reads from or writes to a removable, nonvolatile memory 652, and an optical disk drive 655 that reads from or writes to a removable, nonvolatile optical disk 656 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and USB port 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, universal application platform 645, other program modules 646 and program data 647. Note that these components may either be the same as or different from operating system 634, universal application platform 635, other program modules 636, and program data 637. Operating system 644, universal application platform 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel may be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

The examples illustrated and described herein as well as examples not specifically described herein but within the scope of aspects of the disclosure constitute exemplary means for remote activation of development hardware capabilities in a secure device. For example, the elements illustrated in FIG. 1 and FIG. 2, such as when encoded to perform the operations illustrated in FIG. 3 and FIG. 4, constitute exemplary means for receiving a request for development capabilities from a secure device, generating a system update and certificate for the secure device, and transmitting the system update and certificate, including a key that interacts with a security processor of the secure device to convert hardware capabilities of the secure device and transform the secure device into developer capable hardware.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A method for activating a secure device for application development, the method comprising:
   receiving a request at a device entitlement component for developer capabilities from a secure device in a user mode via a network, the request including a device identifier;
   determining, based on the device identifier, whether the secure device is in at least one allowed development group;
   responsive to determining that the secure device is in the at least one allowed development group, activating the secure device, including associating the device identifier with a developer identifier corresponding to the at least one allowed development group;
   identifying a development tier associated with the developer identifier in a hierarchical set of development tiers, individual development tiers of the hierarchical set of development tiers having individually defined development capabilities;
   generating a cryptographically signed certificate defining a permissions level associated with the identified development tier for the secure device; and
   transmitting the cryptographically signed certificate to the secure device, the cryptographically signed certificate including a key that interacts with a security processor of the secure device to unlock a level of developer hardware capabilities of the secure device corresponding to the defined permissions level of the cryptographically signed certificate to transform the secure device into development capable hardware.

2. The method of claim 1 wherein activating the secure device further comprises:
   determining whether a valid activation code is entered by the secure device at a development center backend; and
   responsive to a determination that the valid activation code is entered, associating the secure device with a developer system update group and a developer mode activation group, the developer system update group providing dynamic system updates to the secure device, the developer mode activation group managing certificates transmitted to the secure device.

3. The method of claim 1, wherein the key included with the cryptographically signed certificate further invokes a new user interface element of a user interface associated with the secure device, the new user interface element providing a selection between the user mode and a developer mode at system boot time.

4. The method of claim 1, wherein the key included with the cryptographically signed certificate further instructs an operating system of the secure device to provide state separation between the user mode and a developer mode via partitioning, the developer mode blocking execution of user mode content, and the user mode blocking execution of developer mode content.

5. The method of claim 1, further comprising:
   registering the secure device as a development device for a time period corresponding to an activation period of the cryptographically signed certificate.

6. The method of claim 5, further comprising:
   revoking the cryptographically signed certificate from the secure device, including reverting the hardware capabilities of the secure device back to the user mode and unregistering the secure device as a development device.

7. The method of claim 1, wherein the secure device is a retail gaming device.

8. The method of claim 1, further comprising:
   updating the hardware capabilities of the secure device via a certificate update.

9. A method for activating a secure device for application development, the method comprising:
   generating a request for developer capabilities at a secure device in a user mode, the request including a device identifier;
   transmitting the request, by the secure device, to a device entitlement service via a network;
   obtaining a cryptographically signed certificate from the device entitlement service, the cryptographically signed certificate including a key that interacts with a security processor of the secure device to activate developer mode capabilities on the secure device; and
   responsive to obtaining the cryptographically signed certificate, rebooting the secure device in a developer mode with activated developer mode capabilities as developer mode capable hardware.

10. The method of claim 9, wherein the key that interacts with the security processor further partitions an operating system of the secure device to provide state separation between the user mode and the developer mode, the developer mode blocking execution of user mode content, and the user mode blocking execution of developer mode content.

11. The method of claim 9, further comprising:
    receiving a system update in response to the request for developer capabilities; and
    applying the system update to the secure device, including generating a new user interface element for a user interface of the secure device, the new user interface element providing a selection between the developer mode and the user mode at system boot time.

12. The method of claim 9, wherein the cryptographically signed certificate further manages communication between applications executing on the secure device and the security processor, the security processor allowing or denying capabilities to the executing applications based on parameters provided by the cryptographically signed certificate.

13. A system for remote activation of a retail device for development, the system comprising:
    a security processor implemented on a secure device;
    a memory communicatively coupled to the security processor; and
    a communication component implemented on the secure device, communicatively coupled to the memory and the security processor, that:
       transmits a request for development capabilities to a device entitlement service via a network; and
       receives a cryptographically signed certificate from the device entitlement service, the cryptographically signed certificate including a key that interacts with the security processor to activate developer mode capabilities on the secure device, including to reboot the secure device in a developer mode as developer mode capable hardware.

14. The system of claim 13, further comprising:
an operating system, the operating system partitioned by the key of the cryptographically signed certificate to provide state separation between a user mode and a developer mode.

15. The system of claim 14, wherein the operating system receives queries from one or more applications executing on the secure device and transmits the queries to the security processor for processing, the security processor processing the queries against the cryptographically signed certificate to determine responses to the queries.

16. The system of claim 13, further comprising:
a user interface component, the user interface component providing a selection between a user mode and a developer mode at system boot time in response to the key converting hardware capabilities of the secure device.

17. The system of claim 16, wherein the security processor reboots the secure device in the developer mode as developer mode capable hardware in response to receiving a selection of the developer mode at the user interface component.

18. The system of claim 13, wherein the communication component further receives a revocation of the cryptographically signed certificate, including a revocation of the key that interacts with the security processor, reverting hardware capabilities of the secure device to deactivate developer mode capabilities.

19. The system of claim 13, wherein the communication component receives system updates from a developer system update group and certificate updates from a developer mode activation group via the network in response to activated developer mode capabilities on the secure device.

20. The system of claim 13, wherein the cryptographically signed certificate further defines a hierarchical development level corresponding to a developer identifier and a device identifier associated with the secure device.

* * * * *